United States Patent
Kimble

[11] Patent Number: 5,917,666
[45] Date of Patent: Jun. 29, 1999

[54] REAR VIEW MIRROR HAVING TRAILING DISTANCE INDICIA

[76] Inventor: Griffith E. Kimble, #3 Columbia Court NW, Davenport, Iowa 52804

[21] Appl. No.: 08/840,569

[22] Filed: Apr. 21, 1997

[51] Int. Cl.[6] .................................................. G02B 5/08
[52] U.S. Cl. ........................... 359/838; 359/839; 359/884
[58] Field of Search .................................... 359/838, 839, 359/884; 362/494, 135

[56] References Cited

U.S. PATENT DOCUMENTS

| 4,023,029 | 5/1977 | Fischer | 359/838 |
| 5,289,321 | 2/1994 | Secor | 359/896 |

FOREIGN PATENT DOCUMENTS

| 58-105105 | 6/1983 | Japan | 359/838 |
| A 0105105 | 6/1983 | Japan | 359/838 |

Primary Examiner—Cassandra Spyrou
Assistant Examiner—Craig Curtis
Attorney, Agent, or Firm—Lathrop & Gage, L.C.

[57] ABSTRACT

A rear-view mirror for indicating to an operator of a vehicle the distance between his vehicle and another vehicle trailing therebehind. The device includes a substrate having a reflective surface and indicia thereon, wherein the indicia is dimensioned such that an image of the trailing vehicle substantially "fills" a spacing between opposing portions or segments of the indicia as the trailing vehicle is spaced a predetermined distance therebehind. The indicia may be non-illuminated for daytime use or may be illuminated for nighttime use. The indicia may have a variety of different configurations and may be configured to provide information to the operator of the vehicle as to a plurality of predetermined trailing distances for a plurality of types of trailing vehicles.

16 Claims, 2 Drawing Sheets

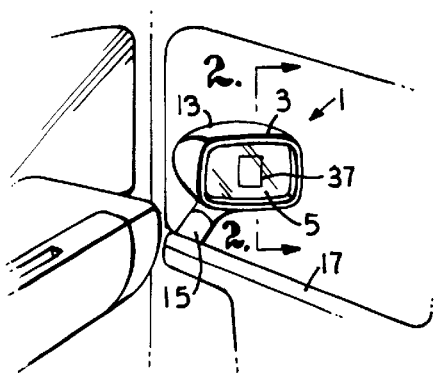
Fig.1.
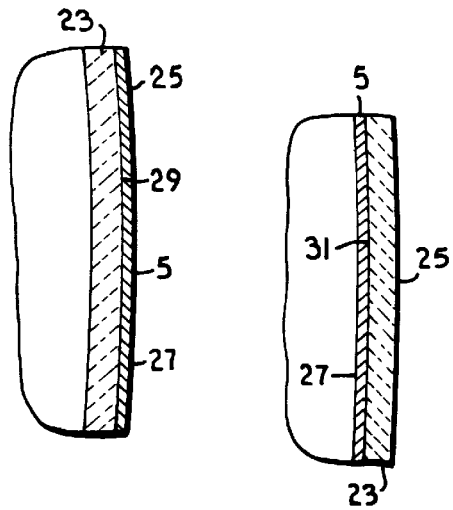
Fig.2.
Fig.3.
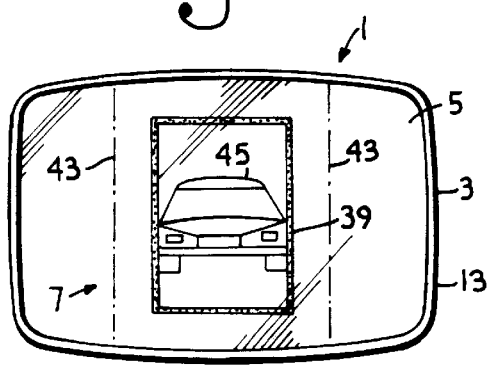
Fig.4.
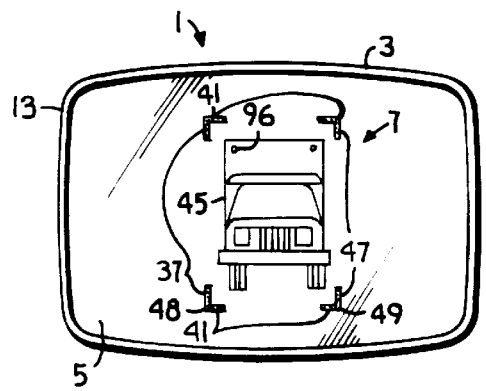
Fig.5.
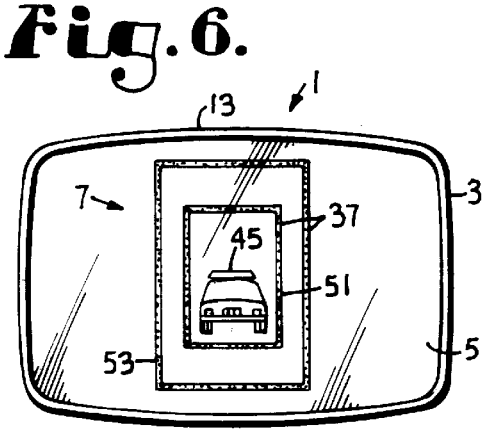
Fig.6.

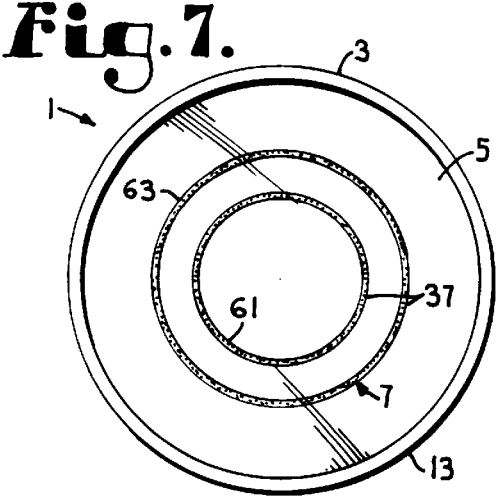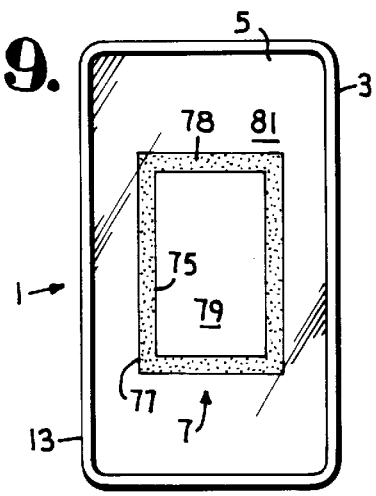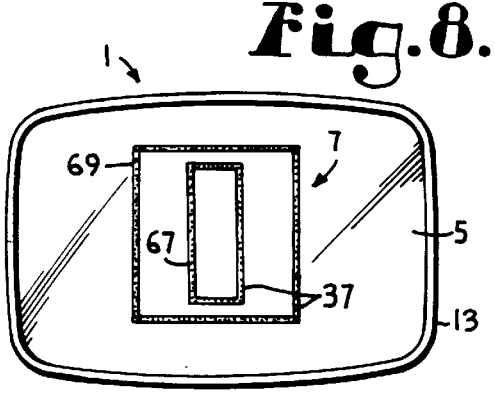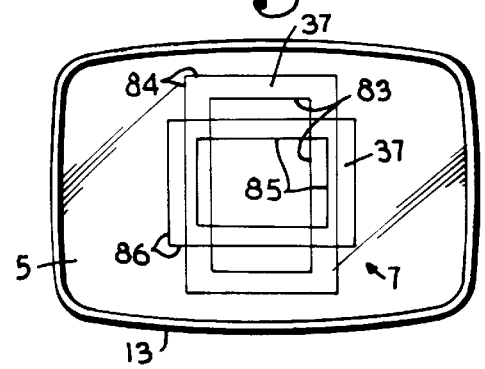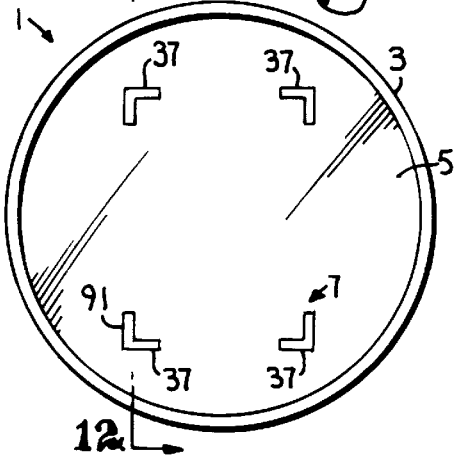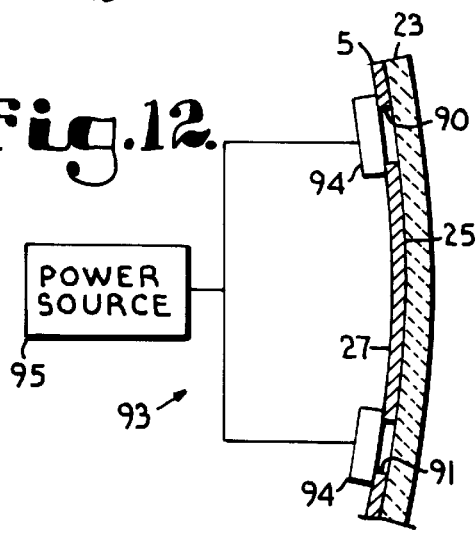

REAR VIEW MIRROR HAVING TRAILING DISTANCE INDICIA

BACKGROUND OF THE INVENTION

1. Field of the Invention.

This invention relates generally to rear view mirrors and, more particularly but without limitation, to convex rear view mirrors for vehicles.

2. Description of the Related Art.

To provide a more panoramic view of a rearward view from a vehicle, a rear view mirror mounted exteriorly on the passenger side of the vehicle sometimes has a convex mirror in order to provide a wider range of view for the operator of the vehicle. The convex shape of the mirror causes a trailing car to appear smaller than would be the case if that mirror had a flat or planar reflective surface. This size distortion phenomenon causes the trailing car to appear to be farther away than it actually is, thereby providing the operator of the vehicle with a false sense of security and thereby increasing the possibility of an unsafe lane change, etc.

The method currently used to help prevent such an occurrence is to etch or otherwise provide a note on the mirror stating that the car behind may be closer than it appears. For example, such a note may contain a message such as "OBJECTS IN MIRROR ARE CLOSER THAN THEY APPEAR" or other suitable message. Unfortunately, such a notice does not provide the operator with any indication as to the distance spacing between his vehicle and a trailing vehicle or any indication as to how rapidly the trailing vehicle may be approaching his vehicle.

Many vehicles equipped with a convex rear view mirror are also equipped with a planar rear view mirror, which might provide information upon which a trailing distance or approaching speed could be more accurately estimated, at least for operators having good reliable vision in both eyes. Such planar rear view mirrors are generally mounted either interiorly for viewing through a rear window and/or exteriorly on the operator's side of the vehicle. Many times, the interior rear view mirror is not usable because of articles in a rear seat obstructing the rearward view of that mirror, because there is no rear window, etc. Also, it is not uncommon for the rear view mirror exteriorly mounted on the operator's side of the vehicle to become disabled, such as when two vehicles pass too closely and the mirrors collide, or for various other reasons. In that event, the operator would then generally rely on the convex rear view mirror mounted on the passenger side of the vehicle.

Further, operator's having good reliable eyesight in only one eye may have difficulty judging the spacing between his vehicle and a trailing vehicle or the rate at which a trailing vehicle is overtaking his vehicle even with a planar mirror. The same difficulty may sometimes apply to persons having eyesight in both eyes but whose field of view is limited due to glaucoma or other possible diseases or hindrances.

What is needed is a mechanism that provides the operator of a vehicle with a reliable indication of the spacing between his vehicle and a trailing vehicle and an indication of the speed at which his vehicle is being overtaken by the trailing vehicle.

SUMMARY OF THE INVENTION

According to the invention, there is provided an improved rear view mirror device for indicating the distance between a first vehicle on which the device is mounted and another vehicle trailing therebehind. The device includes a substrate having a reflective surface configured to operably provide, to the operator of the first vehicle, an image of the trailing vehicle, and indicia, fixedly positioned relative to said reflective surface, that is dimensioned such that the image of the trailing vehicle substantially "fills" a spacing between opposing portions or segments of the indicia as the trailing vehicle is spaced a predetermined distance rearwardly from the first vehicle. The reflective surface may be an integral part of the substrate, or may be a coating affixed to either the front surface or rear surface of the substrate. Further, the reflective surface may be either convex or planar of fixed or variable radius.

The indicia may be continuous or segmented, may be circular or arcuate, rectangular, two or more corners of a rectangle, an opposing pair of vertical lines, or any other suitable configuration. The indicia may be a band having an inner edge and an outer edge wherein the inner edge is dimensioned such that the image of a second or trailing vehicle substantially "fills" a spacing between opposing portions of the inner edge as the trailing vehicle is spaced a predetermined first distance behind a first or operator's vehicle and the outer edge is dimensioned such that the image of the trailing vehicle substantially "fills" a second spacing between opposing portions of the outer edge as the trailing vehicle is spaced a predetermined second distance behind the operator's vehicle. The band may be only partially reflective compared to the surrounding reflective surface.

Further, the indicia may include a first portion and a second portion, wherein the first portion is dimensioned such that the image of the trailing vehicle substantially "fills" a spacing between opposing segments of the first portion as the trailing vehicle is spaced a predetermined first distance behind the first vehicle and wherein the trailing vehicle is a first type of vehicle such as a truck, automobile or motorcycle, and wherein the second portion is dimensioned such that the image of the trailing vehicle substantially "fills" a spacing between opposing segments of the second portion as the trailing vehicle is spaced a predetermined second distance behind the first vehicle and wherein the trailing vehicle is a different type of vehicle.

The indicia may be adapted for nighttime or subdued lighting conditions by defining the indicia by voids in the reflective surface such that the indicia may be made visible to the operator by backlighting, such as by placing a light emitting substance adjacent to such voids and driving the light emitting substance with an energy source provided by the vehicle.

PRINCIPAL OBJECTS AND ADVANTAGES OF THE INVENTION

The principal objects and advantages of the present invention include: providing a rear view mirror for a vehicle wherein the mirror has indicia for indicating to an operator of the vehicle a predetermined spacing between the vehicle and another vehicle trailing therebehind; providing such a rear view mirror with such indicia wherein the indicia indicates to the operator a plurality of predetermined spacings between the vehicle and one or more vehicles trailing therebehind; providing such a rear view mirror with such indicia wherein the indicia provides the operator with a sense of how rapidly a trailing vehicle is overtaking the vehicle of the operator; providing such a rear view mirror with such indicia wherein the indicia indicates to the operator a predetermined spacing between the vehicle and a plurality of different types of vehicles trailing therebehind;

providing such a rear view mirror with such indicia wherein the indicia is illuminated for use during nighttime and subdued lighting conditions; providing such a rear view mirror with such indicia that provides trailing distance information for operators having good reliable visibility in only one eye; and generally providing such a rear view mirror device with such indicia which is economical to manufacture, efficient in operation, reliable in performance, capable of long operating life and particularly well adapted for the proposed usage thereof.

Other objects and advantages of the present invention will become apparent from the following description taken in conjunction with the accompanying drawings, which constitute a part of this specification and wherein are set forth exemplary embodiments of the present invention to illustrate various objects and features thereof.

BRIEF DESCRIPTION OF THE DRAWINGS

FIG. 1 is a perspective view of a rear view mirror device for a vehicle, according to the present invention.

FIG. 2 is an enlarged and fragmentary, cross-sectional view of the rear view mirror device, taken along line 2—2 of FIG. 1, showing a reflective coating on a first surface of a substrate hereof.

FIG. 3 is an enlarged and fragmentary, cross-sectional view of the rear view mirror device, similar to that of FIG. 2 but showing a reflective coating on a second or rear surface of the substrate.

FIG. 4 is an enlarged, but reduced relative to FIGS. 2 and 3, fragmentary view of the rear view mirror device, showing indicia thereof.

FIG. 5 is an enlarged and fragmentary view of the rear view mirror device, showing indicia similar to FIG. 4 but utilizing only segments thereof.

FIG. 6 is an enlarged and fragmentary view of the rear view mirror device, showing indicia for images of a particular type of vehicle spaced at two different trailing distances.

FIG. 7 is an enlarged and fragmentary view of the rear view mirror device, showing an alternative profile for indicia for images of a vehicle spaced at different trailing distances.

FIG. 8 is an enlarged and fragmentary view of the rear view mirror device, showing indicia having a first portion for an image of a first type of vehicle spaced at a particular trailing distance and a second portion for an image of a second type of vehicle spaced at the same or a different trailing distance as the first type of vehicle.

FIG. 9 is an enlarged and fragmentary view of the rear view mirror device, showing an alternative indicia, wherein an inner edge thereof corresponds to the image of a vehicle spaced at one trailing distance and an outer edge thereof corresponds to the image of the vehicle spaced at a closer trailing distance and wherein the indicia is partially reflective such that portions of the image of the trailing vehicle spaced between the inner edge and the outer edge are discernible by a user.

FIG. 10 is an enlarged and fragmentary view of the rear view mirror device showing two sets of indicia, one set for images of a first type of vehicle spaced at different trailing distances and the other set for images of a second type of vehicle spaced at the same or different trailing distances as the first type of vehicle.

FIG. 11 is an enlarged and fragmentary view of the rear view mirror device, showing indicia defined by transmissive portions thereof.

FIG. 12 is a further enlarged and fragmentary, cross-sectional and schematic view of the rear view mirror, taken along line 12—12 of FIG. 11, showing a light-emitting arrangement for illuminating transmissive portions of the indicia, according to the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral I generally refers to a rear view mirror device for a vehicle in accordance with the present invention, as exemplarily shown in FIGS. 1 through 12. The device 1 includes body means 3, imaging means 5, and trailing distance indication means 7.

The body means 3 generally includes a housing 13 and mounting means 15 for mounting the housing 13 to a vehicle 17. The imaging means 5 includes a rigid substrate 23 mounted in the housing 13, as shown in FIG. 1, by methods commonly known in the art. The substrate 23 has a reflective surface 25 to provide an operator of the vehicle 17 with a rearward view, particularly of other vehicles following or trailing the vehicle 17. Generally, the reflective surface 25 has a convex shape relative to the operator's perspective. The reflective surface 25 may be an inherent characteristic of the substrate 23 itself, such as a polished surface of a substrate 23 constructed of stainless steel or other suitable material.

Alternatively, the substrate 23 may be constructed of glass, or other suitable material, with a reflective coating 27 applied thereto, as shown in FIGS. 2, 3 and 12. In such an arrangement, the reflective coating 27 may be applied either to the first or front surface 29 of the substrate 23, as shown in FIG. 2, or to the second or rear surface 31 of the substrate 23, as shown in FIG. 3. The substrate 23 and reflective surface 25 as hereinbefore described is known in the art.

The trailing distance indication means 7 includes at least one set of indicia 37 that is visible to the operator of the vehicle 17 and is generally fixed relative to the reflective surface 25. One configuration for the set of indicia 37 is shown in FIG. 4 wherein the indicia 37 is a rectangularly shaped line FIG. 39. Alternatively, the set of indicia 37 may include only corner segments 41 of the line FIG. 39, as shown in FIG. 5. Further, the set of indicia 37 may include only vertical segments 43 of the line FIG. 39, as shown in phantom lines in FIG. 4.

The various elements of the set of indicia 37 are dimensioned such that the image of a trailing vehicle 45 appears to be encircled, circumscribed or otherwise delineated by the set of indicia 37 as the trailing vehicle is spaced rearwardly from the vehicle 17 by a predetermined distance. For example, the vertical portions of the line FIG. 39 are spaced apart from each other such that the overall width of the image of the trailing vehicle 45 appears to "fill" the horizontal spacing therebetween, as shown in FIG. 4. It is to be understood that "filling" of the space between opposing portions of the respective set of indicia 37 may constitute opposite sides of the image of the trailing vehicle 37 appearing to substantially abut against those opposing portions as the trailing vehicle is trailing the vehicle 17 by a distance of approximately three car-lengths, six car-lengths, or some other predetermined distance.

Alternatively, the set of indicia 37 may be dimensioned such that the image of the trailing vehicle 37 only substantially "fills" the spacing between the respective opposing portions of the set of indicia 37 as the trailing vehicle trails the vehicle 17 by the predetermined distance, as shown in FIG. 4. For example, an operator having good visual capability in both eyes may experience a certain amount of parallax relative to one or both eyes. In other words, an extremity of the image of a trailing vehicle 45 may appear to abut against a vertical portion of a set of indicia 37 when viewed by only one eye but may appear to be spaced apart from that same vertical portion when viewed by the other eye. Thus, for some applications, it may be desirable to dimension the spacing between the vertical portions of the set of indicia 37 such that the leftmost extremity of an image of a trailing vehicle 45 abuts against the leftmost vertical portion of the set of indicia 37 when viewed only by the left eye of the operator of the vehicle 17, and the rightmost extremity of the image of the trailing vehicle 45 abuts against the rightmost vertical portion of the set of indicia 37 when viewed only by the right eye of the operator as the trailing vehicle trails the vehicle 17 by a predetermined distance.

It is foreseen that the most reliable indication of the trailing distance of a trailing vehicle is the width of the image of the trailing vehicle 45. For some applications, it may be desirable to also have spaced apart horizontal portions of the set of indicia 37 that are "filled" or substantially "filled" by the overall height of the image of the vehicle 45 as the trailing vehicle trails the vehicle 17 by a predetermined distance. For example, the vertical spacing between horizontal portions of the corner segments 41, designated by the numerals 47 and 48 in FIG. 5, may be substantially "filled" by the overall height of the image of the trailing vehicle 45, a semi-tractor trailer unit in FIG. 5, as the horizontal spacing between vertical portions of the corner segments 41, designated by the numerals 48 and 49, are substantially "filled" by the overall width of the image of the trailing vehicle 45. It should be obvious that the same considerations would apply to the example shown in FIG. 4; that is, the overall height of the image of the trailing semi-tractor trailer vehicle 45 shown in FIG. 5 would substantially "fill" the spacing between the horizontal portions of the rectangular set of indicia 37 in FIG. 4 as the overall width of the image of the trailing semi-tractor trailer vehicle 45 substantially "fills" the spacing between the vertical portions of the set of indicia 37 shown in FIG. 4.

For purposes of discussion, assume that the set of indicia 39, as shown in FIG. 4, is substantially horizontally "filled" by the image of the trailing vehicle 45 as the trailing vehicle trails the vehicle 17 by six car-lengths. As the trailing vehicle approaches more closely to the vehicle 17, the corresponding image of the trailing vehicle 45 appears larger in the reflective surface 25. The horizontal separation between the vertical segments 43 may be dimensioned such that the overall width of the image of the trailing vehicle 45 substantially "fills" that horizontal spacing as the trailing vehicle is spaced approximately three car-lengths behind the vehicle 17. Thus, for one of the devices 1 having both a first set of indicia 37 for indicating vehicles trailing the vehicle 17 at a first predetermined distance and a second set of indicia 37 for indicating vehicles trailing at a second, closer predetermined distance, an operator of the vehicle 17 will have some indication as to how rapidly a trailing vehicle is gaining an the vehicle 17 by the apparent time that the respective trailing vehicle traversed the spacing between the first predetermined distance and the second predetermined distance.

An example of the device 1 having two similar sets of indicia 37 is shown in FIG. 6. The first or inner set of indicia 37, designated by the numeral 51, may be dimensioned to be substantially "filled" —vertically, horizontally, or both—by the image of a trailing semi-tractor trailer vehicle 45 as the semi-tractor trailer vehicle trails the vehicle 17 by a first predetermined distance, e.g., twelve car-lengths. Similarly, the second or outer set of indicia 37, designated by the numeral 53, may be dimensioned to be substantially "filled" —vertically, horizontally, or both—by the image of the trailing semi-tractor trailer vehicle 45 as the semi-tractor trailer vehicle trails the vehicle 17 by a second, closer predetermined distance, e.g., six car-lengths. As before, the operator of the vehicle 17 may acquire a sense of how rapidly the trailing semi-tractor trailer vehicle is approaching based on the time interval required for the image of the trailing semi-tractor trailer vehicle to expand from substantially "filling" the set of indicia 51 to substantially "filling" the set of indicia 53.

An alternative configuration for the sets of indicia 37 is shown is shown in FIG. 7, wherein a first or inner set of the set of indicia 37, designated by the numeral 61, may be dimensioned to be substantially "filled" by diametrically opposite extremities of the image of a trailing vehicle 45 as the trailing vehicle trails the vehicle 17 by a first predetermined distance, e.g., six car-lengths. Similarly, the second or outer set of indicia 37, designated by the numeral 63, may be dimensioned to be substantially "filled" by diametrically opposite extremities of the image of a trailing vehicle 45 as the trailing vehicle trails the vehicle 17 by a second, closer predetermined distance, e.g., three car-lengths. Again, the operator of the vehicle 17 may acquire a sense of how rapidly the trailing vehicle is overtaking the vehicle 17 by the length of time required for the image of the trailing vehicle to expand from substantially "filling" the set of indicia 61 to substantially "filling" the set of indicia 63.

It is to be understood that the set of indicia 37 is not limited to a circular or rectangular configuration, or portions thereof, but may take the form of a triangle, set of crossed lines, or any other suitable configuration. In addition, the set of indicia 37 may be inscribed, painted, printed, etched, or otherwise affixed to the substrate 23. Sizing of the set of indicia 37 may be determined mathematically, experimentally, or otherwise as necessary to provide predetermined trailing distance or distances to the operator of the vehicle 17 as herein described. The dimensions of the set of indicia 37 generally depends on a plurality of variables, including the radius of curvature of the reflective surface 25, the size of the trailing vehicle, the predetermined trailing distance of the trailing vehicle from the reflective surface 25, and the distance of the operator of the vehicle 17 from the reflective surface 25.

Another alternative configuration for the sets of indicia 37 is shown is shown in FIG. 8, wherein a first or inner set of the set of indicia 37, designated by the numeral 67, may be dimensioned to be substantially "filled" by appropriate extremities of the image of a first type of trailing vehicle 45, such as a motorcycle, as the first type of trailing vehicle trails the vehicle 17 by a first predetermined distance, e.g., six car-lengths. Similarly, the second or outer set of indicia 37, designated by the numeral 69, may be dimensioned to be substantially "filled" by appropriate extremities of the image of a second type of trailing vehicle 45, such as a truck, as the second type of trailing vehicle trails the vehicle 17 by a predetermined distance which may be the same as, or different from, the first predetermined distance, as desired.

Yet another alternative configuration of the set of indicia 37 is shown in FIG. 9, designated by the numeral 73, similar to that shown in FIG. 6 wherein an inner edge 75 thereof corresponds to the set of indicia 51 and an outer edge 77 thereof corresponds to the set of indicia 53. In other words, the inner edge 75 of the set of indicia 73 may be dimensioned to be substantially "filled" by appropriate extremities of the image of a trailing vehicle 45 as the trailing vehicle trails the vehicle 17 by a first predetermined distance, and the outer edge 77 of the set of indicia 73 may be dimensioned to be substantially "filled" by appropriate extremities of the image of a trailing vehicle 45 as the trailing vehicle trails the vehicle 17 by a second, closer predetermined distance. The region 78 between the inner edge 75 and the outer edge 77 of the set of indicia 73 is distinguishable from the portion of the reflective surface 25 spaced within the inner edge 75, designated by the numeral 79, and the portion of the reflective surface 25 spaced outside of the outer edge 77, designated by the numeral 81, by reduced reflectance. In other words, the reflective surface 25 in the region 78 has properties characteristic of "half-silvering" wherein the reflectance thereof is less than that of the portions of the reflective surface 25 thereabout but is sufficient to provide the operator of the vehicle 17 with a recognizable image of the trailing vehicle 45 as that image expands to "fill" the spacing defined by the outer edge 77.

Still yet another alternative configuration for the sets of indicia 37 is shown is shown in FIG. 10, wherein a first set of indicia 37 has a first inner set of indicia, designated by the numeral 83, dimensioned to be substantially "filled" by appropriate extremities of the image of a first type of trailing vehicle 45 as the first type of trailing vehicle trails the vehicle 17 by a first predetermined distance, and a first outer set of indicia, designated by the numeral 84, dimensioned to be substantially "filled" by appropriate extremities of the image of the first type of trailing vehicle 45 as the first type of trailing vehicle trails the vehicle 17 by a second, closer predetermined distance. Similarly, a second set of indicia 37 has a second inner set of indicia, designated by the number 85, dimensioned to be substantially "filled" by appropriate extremities of the image of a second type of trailing vehicle 45 as the second type of trailing vehicle trails the vehicle 17 by a second predetermined distance, and a second outer set of indicia, designated by the numeral 86, dimensioned to be substantially "filled" by appropriate extremities of the image of the second type of trailing vehicle 45 as the second type of trailing vehicle trails the vehicle by a second, closer predetermined distance. It is to be understood that the first and second trailing distances defined respectively by the first inner set of indicia 83 and the first outer set of indicia 84 may be the same as or different from appropriately selected ones of the first and second trailing distances defined respectively by the second inner set of indicia 85 and the second outer set of indicia 86.

To enhance visibility of the indicia means 7 during subdued lighting or nighttime conditions, the set of indicia 37 may be constructed of luminescent paint, such as that used for highway signs, or other suitable vision enhancing mechanisms or materials. Alternatively, the substrate 23 may be constructed of transparent or translucent material, the set of indicia 37 may be defined by the reflective coating 27 having voids 90, 91 therein as shown in FIGS. 11 and 12, and a backlighting arrangement 93 spaced in close proximity to the voids 90, 91 such that the voids 90, 91 are illuminated from the perspective of the operator of the vehicle 17. The backlighting arrangement 93 may include one or more portions of an LED or electroluminescent panel 94 or other suitable backlighting arrangement powered by a power source 95. For example, the backlighting arrangement 93 may be powered by the same source used to power remote alignment of the imaging means 5, the same source used to power heating of the imaging means 5, or other suitable arrangement. In rural situations, the predominantly visible feature of the image of the trailing vehicle 45 may be headlights; in that event, it may be desirable for the illuminated voids 90, 91 to be configured as vertical segments 43, similar to those shown in FIG. 4. In the case of a large truck or semi-tractor trailer vehicle 45, the image of the trailing vehicle 45 generally includes images of clearance lights 96 arranged along the front of the tractor cab and the front of the trailer.

As before, the horizontal spacing between the vertical portions of the set of indicia 37 defined by the voids 90, 91 is dimensioned such that the spacing is substantially "filled" by visible outer extremities, namely the headlights and/or clearance lights, of the trailing vehicle. It is foreseen that some applications of the device may utilize a non-illuminated set of indicia 37 for daytime use and an illuminated set of the indicia 37 for nighttime use wherein the horizontal spacing between vertical portions of the illuminated set of the indicia 37 is less than the horizontal spacing between vertical portions of the non-illuminated set to allow for portions of the trailing vehicle spaced between the outer extremities of the headlights and the outer extremities of the trailing vehicle, which portions may not be visible at night. It is to be understood that backlighted embodiments of the device 1 may include multiple sets of the indicia 37 as herein described.

It should be obvious that the various features of the device 1 as described herein for a convex mirror are equally applicable to provide equivalent features for a planar rear view mirror for the benefit of operators having impaired vision and operators having good reliable vision in only one eye.

It is to be understood that while certain forms of the present invention have been illustrated and described herein, it is not to be limited to the specific forms or arrangement of parts described and shown.

What is claimed and desired to be secured by Letters Patent is as follows:

1. A device for a leading vehicle, comprising:
    (a) a substrate having a reflective surface configured to operably provide, to an operator of the leading vehicle, an image of a following vehicle spaced generally rearwardly from the leading vehicle; and
    (b) indicia, fixedly positioned relative to said reflective surface, including:
        (1) a first set of indicia having a first inner edge and a first outer edge, wherein said first set of indicia is configured such that an image of a first following vehicle is viewable between said first inner edge and said first outer edge, and said first inner edge is dimensioned such that said image of the first following vehicle substantially fills a first spacing between opposing portions of said first inner edge as the first following vehicle is spaced a predetermined first distance behind the leading vehicle and said first outer edge is dimensioned such that said image of the first following vehicle substantially fills a second spacing between opposing portions of said first outer edge as the first following vehicle is spaced a predetermined second distance behind the leading first vehicle, and (2) a second set of indicia having a second inner edge and a second outer edge, wherein said second set of indicia is configured such that an image of a second following vehicle is viewable between said second inner edge and said second outer edge, and said second inner edge is dimensioned such that said image of the second following vehicle substantially fills a third spacing between opposing portions of said second inner edge as the second following vehicle is spaced a predetermined third distance behind the leading vehicle and said second outer edge is dimensioned such that said image of the second following vehicle substantially fills a fourth spacing between opposing portions of said second outer edge as the second following vehicle is spaced a predetermined fourth distance behind the leading vehicle; and, wherein said first set of indicia is configured for the first following vehicle being of a first type and said second set of indicia is configured for the second following vehicle being of a second type; wherein the first vehicle and second vehicle are of different sizes.

2. The device according to claim 1, wherein said substrate has a first surface on which said reflective surface is formed.

3. The device according to claim 1, wherein said substrate has a second surface on which said reflective surface is formed.

4. The device according to claim 1, wherein said reflective surface is convex.

5. The device according to claim 1, wherein at least one set of said indicia comprises at least two spaced apart segments.

6. The device according to claim 5, wherein said at least two spaced apart segments includes a pair of vertical segments.

7. The device according to claim 5, wherein said at least two spaced apart segments comprises two diagonally opposing corners.

8. The device according to claim 1, wherein said indicia is only partially reflective.

9. The device according to claim 1, wherein said indicia has a generally circular shape.

10. The device according to claim 1, wherein said indicia has a generally rectangular shape.

11. The device according to claim 1, wherein the second vehicle is a motorcycle.

12. The device according to claim 1, wherein the second vehicle is a truck.

13. The device according to claim 1, wherein the second vehicle is an automobile.

14. The device according to claim 1, wherein at least one set of said indicia is defined by at least one void in said reflective surface.

15. The device according to claim 14, including a light source for illuminating said indicia.

16. The device according to claim 15, wherein said light source includes a light-emitting substance.

* * * * *